United States Patent Office 3,743,614
Patented July 3, 1973

3,743,614
STABILIZED POLYOXYMETHYLENE MOLDING COMPOSITIONS CONTAINING A MIXTURE OF AN ALKALINE EARTH METAL SALT AND AN ESTER OF (ALKYLHYDROXYPHENYL)-CARBOXYLIC ACIDS WITH A POLYOL
Ernst Wolters, Frankfurt am Main, and Gunther Roos, Kelkheim, Taunus, Germany, assignors to Farbwerke Hoechst Aktiengesellschaft vormals Meister Lucius & Bruning, Frankfurt am Main, Germany
No Drawing. Filed Aug. 31, 1971, Ser. No. 176,693
Claims priority, application Germany, Sept. 2, 1970, P 20 43 498.4
Int. Cl. C08g 51/56
U.S. Cl. 260—18 R                6 Claims

ABSTRACT OF THE DISCLOSURE

The stabilization of polyoxymethylenes against oxidation and thermal decomposition is carried out by adding a combination of alkaline earth metal compounds and esters of (alkyl-hydroxyphenyl)-carboxylic acids with polyols. Molding compositions made from polyoxymethylenes so stabilized may be thermoplastically processed; they are suitable for the manufacture of semi-finished and finished goods.

---

The present invention relates to stabilized molding compositions on the basis of polyoxymethylenes.

It is known that polyoxymethylenes, i.e. homo- or copolymers of formaldehyde or of cyclic oligomers of formaldehyde, for example trioxan, can be stabilized against the influence of heat and oxygen by addition of stabilizers.

As stabilizers, for example phenols, amines, amides, amidines, hydrazines, ureas, thioureas and polyamides are used. The stabilizing effect of these substances is based on their capability to absorb the aldehydes and their by-products which are formed by thermal chain cleavage, to block the active centers in the polymer and, thus, to prevent depolymerization.

The efficiency of the above substances varies considerably. The derivatives of hydrazine, urea and thiourea have only a slight stabilizing effect against heat and oxygen. The amine stabilizers, however, though being excellent antioxidants, cause a brown to black discoloration of the polyoxymethylenes. Part of the known phenolic stabilizers also cause discolorations, and other stabilizers easily diffuse out of the polymer or can be dissolved out, in which case the stability of the products stabilized by these substances deteriorates under the action of heat and/or upon contact with solvents.

It has now been found that polyoxymethylenes can be excellently stabilized against oxidation and thermal degradation by using a combination of alkaline earth metal compounds and esters of (alkyl-hydroxyphenyl)-carboxylic acids with polyols.

It has already been proposed to use different hydroxyphenyl-alkanoic acid compounds as stabilizers for organic substances, especially for poly-olefins (cf. German Pats. Nos. 1,163,017 and 1,201,349, German Auslegeschrift No. 1,286,041, Belgian Pat. No. 636,254 and Netherlands patent application No. 6808946). It is also known that hydroxyphenyl-alkanoic acid compounds can be used for the stabilization of polyoxymethylenes (cf. French Pat. No. 1,489,414).

Surprisingly, certain particular hydroxyphenyl-carboxylic acid esters in combination with alkaline earth metal compounds show a substantially more favourable stabilization efficiency in polyoxymethylenes than the known hydroxyphenyl-alkanoic acid esters, which is due to a strong synergistic effect of the compounds.

The present invention provides stabilized molding compositions on the basis of polyoxymethylenes containing (1) from 0.05 to 4, preferably from 0.1 to 2% by weight, calculated on the polyoxymethylene, of compounds of the formula

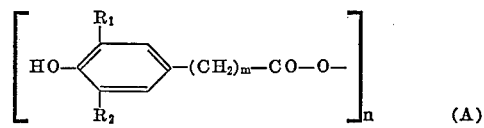

in which $R_1$ represents an alkyl radical having from 1 to 6, preferably from 1 to 4 carbon atoms, $R_2$ is a hydrogen atom or an alkyl radical having from 1 to 6, preferably from 1 to 4 carbon atoms, A stands for a bi- to hexavalent, preferably bi- to tetravalent, straight-chain or branched aliphatic hydrocarbon radical having from 1 to 12, preferably from 1 to 6 carbon atoms, $m$ is zero or an integer of from 1 to 6, preferably zero, 1 or 2, and $n$ corresponds to the valence of A, and (2) from 0.01 to 3, preferably from 0.1 to 2% by weight, calculated on the polyoxymethylene, of alkaline earth metal salts of carboxylic acids having from 10 to 20, preferably from 12 to 18 carbon atoms, and/or alkaline earth metal hydroxides.

The stabilizer combination used according to the invention neither can be dissolved out by usual solvents, nor diffuse out of the polyoxymethylene under thermal load, so that the molding compositions of the invention are especially suitable for use at high temperatures or in contact with solvents. The stabilizers used are colorless and do not or only insignificantly discolor the polyoxymethylenes even under a prolonged influence of heat, light or alkaline media.

Esters of araliphatic or aromatic carboxylic acids substituted in the nucleus, suitable for use as component (1) of the stabilizer combination are for example especially esters of araliphatic or aromatic monocarboxylic acids having from 7 to 13, preferably from 7 to 9 carbon atoms, the aromatic nucleus of which, in 3- or 3- and 5-position, is substituted by an aliphatic alkyl radical having from 1 to 4 carbon atoms and of straight-chain or branched mono- to tetrahydric alcohols, for example esters of ω-(3-tert.-butyl - 4 - hydroxyphenyl)-pentanoic acid, of β-(3-methyl - 5 - tert.-butyl - 4 - hydroxyphenyl)-propionic acid, of 3,5-di-tert.-butyl-4-hydroxy-benzoic acid, of 3,5-di-tert.-butyl-4-hydroxy-phenyl acetic acid, of β-(3,5-di-tert.-butyl-4-hydroxyphenyl)-propionic acid or of (3,5-di-isopropyl-4-hydroxyphenyl)-acetic acid with ethylene glycol, propanediol-(1,2), propanediol-(1,3), butanediol-(1,4), hexanediol-(1,6), decanediol-(1,10), 1,1,1-trimethylol-ethane or pentaerythritol.

As alkaline earth metal compounds, the hydroxides of magnesium, calcium, barium and strontium or the salts of these metals with saturated or unsaturated carboxylic acids having from 10 to 20, preferably from 12 to 18 carbon atoms, are especially suitable. The carboxylic acids may also be substituted by OH groups. Especially advantageous are the calcium salts of lauric acid, stearic acid and ricinoleic acid.

If necessary, the molding compositions according to the present invention may contain further stabilizers, for example known light stabilizers, such as derivatives of benzophenone, acetophenone or triazine. Other known additives, such as dyestuffs, pigments or fillers may also be added.

The stabilizers may be incorporated into the polyoxymethylene in the form of a powder by means of commercial mixers, for example dry mixers, or they may be dissolved in a suitable solvent, for example methanol, acetone or methylene chloride, and applied to the polymer, while stirring. Subsequently, the solvent is evaporated.

Polyoxymethylenes which may be stabilized in accordance with the present invention, are homopolymers of formaldehyde or of cyclic oligomers of formaldehyde, for example, trioxan, the terminal hydroxyl groups of which are blocked by esterification or etherification, and copolymers of formaldehyde or of cyclic oligomers of formaldehyde, preferably trioxan, which contain oxyalkylene groups with at least two, preferably from two to four adjacent carbon atoms in the main valence chain. The proportion of comonomers is of from 0.1 to 50% by weight, preferably from 0.1 to 15% by weight.

As compounds which are suitable for cationic copolymerization with formaldehyde or cyclic oligomers of formaldehyde, preferably trioxane, there may especially be used cyclic ethers and/or cyclic acetals and/or linear polyacetals. Especially suitable are cyclic ethers having from 3 to 5 ring members, preferably epoxides, furthermore cyclic acetals having from 5 to 11, preferably from 5 to 8 ring members, and, more especially cyclic formals of $\alpha,\omega$-diols having from 2 to 8, preferably from 2 to 4 carbon atoms in the chain, the carbon chain of which may be interrupted by an oxygen atom at intervals of 2 carbon atoms, as well as linear polyformals.

Especially suitable are compounds of the formula

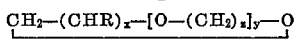

$$CH_2-(CHR)_x-[O-(CH_2)_z]_y-O$$

in which R represents a hydrogen atom, an alkyl radical having from 1 to 6, preferably from 1 to 3 carbon atoms, which may be substituted by 1 to 3 halogen atoms, preferably chlorine atoms, an alkoxymethyl radical having from 2 to 6, preferably from 2 to 4 carbon atoms, a phenyl radical or a phenoxymethyl radical; $x$ stands for an integer of from 1 to 3, $y$ being zero in this case; or $y$ is an integer of from 1 to 3, $x$ being zero and $z$ being 2; or $z$ represents an integer of from 3 to 6, preferably 3 or 4, $x$ being zero and $y$ being 1 in this case.

As cyclic ethers, for example ethylene oxide and epichlorhydrine may be used, as well as propylene oxide, styrene oxide, cyclohexene oxide, oxacyclobutane, phenylglycidyl ether and butanediol-diglycidyl ether, while as cyclic formals for example 1,3-dioxolane, 1,3-dioxepane and 1,3,6-trioxocane as well as 4-chloromethyl-1,3-dioxolane, 1,3-dioxonane and 1,3-dioxacycloheptene-(5) are used.

The polyoxymethylenes used in accordance with the present invention are macromolecular substances; their reduced specific viscosity (RSV-value, $\eta_{red}$), measured at 140° C. with a solution of 0.5% by weight of a solution of the polymer in $\gamma$-butyrolactone containing 2% by weight of diphenylamine as stabilizer, is within the range of from 0.3 to 3.0, preferably from 0.5 to 2 decilitres per gram (dl./g.). The crystallite melting points of the cited polyoxymethylenes are in the range of from 150° to 180° C.

The stability of the polyoxymethylenes towards heat and oxidation is examined by determining the loss of weight of a granular sample after 45 minutes or 120 minutes at 230° C. in air. In order to determine the color value and the color stability, round color samples in the form of flats are fabricated from the individual testing granules, the flats having a thickness of 2.5 millimeters and a diameter of 4.5 centimetres and their yellow value is measured in a differential colorimeter. (Colormaster equipment of Manufacturing, Engineering and Equipment Corporation, Hatboro, Pa.) before and after heating for 30 minutes at 230° C. in a closed mold.

The resistance to aging is evaluated by determining the modification of some mechanical properties of standard testing rods after storage for 1 year at 100° C. in a drying cabinet.

The molding compositions in accordance with the present invention can be worked in the thermoplastic range by injection-molding, extrusion, blow molding, melt spinning or deep drawing; they are suitable for the manufacture of semi-finished and finished articles, such as molded articles, for example ribbons, rods, bristles, threads, fibers, plates, films, sheets, tubes or hoses, as well as houseware, for example, bowl or cups, and machine parts, for example, casings or gear wheels.

The following examples illustrate the invention; parts and percentages being by weight unless otherwise stated.

EXAMPLES 1 TO 10

A copolymer made from 98% of trioxan and 2% of ethylene oxide (RSV-value: 0.82 dl./g.) is mixed thoroughly with 0.1% of calcium ricinoleate and the amounts of stabilizer indicated in Table 1, and then granulated in a commercial extruder. The loss of weight is determined with the dried granules after their heating in air at 230° C. for 45 and 120 minutes, respectively.

Furthermore, before and after heating for 30 minutes to 230° C. in a closed mold, round compressed plates having a thickness of 2.5 mm. and a diameter of 4.5 cm. are prepared from the granules, and then the yellow coloration of the plates is determined. Table 1 shows that the stabilizer combinations used in accordance with the present invention are far superior to the stabilizers hitherto used (see comparative Examples A to D) and that the samples made from the molding compositions of the invention show considerably lower yellow values than the comparative samples.

TABLE 1

| Example | Stabilizer | Amount, percent by weight | Loss of weight, percent at— 45 min. | 120 min. | Yellow value— Before | After 30 min. |
|---|---|---|---|---|---|---|
| A | 1-[γ,γ-bis(4-hydroxy-3-sec.butyl-phenyl)-buturyloxy]-dodecane | 0.5 | 2.9 | 24 | 10.6 | 82.3 |
| B | do | 1.0 | 1.3 | 9 | 14.3 | 82.5 |
| C | 1-[γ,γ-bis(4-hydroxy-3-sec.butyl-phenyl)-buturyloxy]-ethane | 0.5 | 2.9 | 17.2 | 7.5 | 81.3 |
| D | do | 1.0 | 1.9 | 10.5 | 12.7 | 82.4 |
| 1 | 1,6-bis[β-(3,5-di-tert.-butyl-4-hydroxy-phenyl)-propionyloxy]-hexane | 0.3 | 1.5 | 4.7 | 1.4 | 30.8 |
| 2 | do | 0.4 | 1.0 | 3.4 | 1.6 | 22.4 |
| 3 | do | 0.5 | 0.8 | 2.8 | 1.1 | 17.1 |
| 4 | do | 0.7 | 0.6 | 2.0 | 1.7 | 15.2 |
| 5 | 1,1,1-tris[β-(3,5-di-tert.-butyl-4-hydroxyphenyl)-propionyloxymethyl]-ethane | 0.5 | 1.1 | 3.3 | 0.4 | 13.5 |
| 6 | do | 0.7 | 0.9 | 2.8 | 1.4 | 20.7 |
| 7 | do | 1.0 | 0.83 | 2.5 | 1.4 | 18.6 |
| 8 | Tetrakis[β-(3,5-di-tert.-butyl-4-hydroxy-phenyl)-propionyloxymethyl]-methane | 0.5 | 0.74 | 5.4 | 1.5 | 16.3 |
| 9 | do | 0.7 | 0.63 | 3.9 | 2.3 | 17.2 |
| 10 | do | 1.0 | 0.59 | 3.0 | 1.6 | 12.0 |

EXAMPLES 11 TO 14

An acetylated formaldehyde homopolymer (RSV value: 0.85 dl./g.) is thoroughly mixed with 0.1% of calcium stearate and the compounds indicated in Table 2 in an impeller mixer (abt. 1500 r.p.m.), and then granulated. After the granulation, the loss of weight of the samples is determined after heating in air at 230° C. for 45 and 120 minutes, respectively. Table 2 shows that the effect of the stabilizer combination used in accordance with the invention is far superior to that of the known stabilizers (see comparative Examples E and F).

Furthermore, the granules are heated for 30 minutes in a closed mold, and round compressed plates having a thickness of 2.5 mm. and a diameter of 4.5 cm. are manufactured from the granules. Subsequently, the discoloration of the plates caused by the molding is determined. The samples of the molding compositions of the invention show substantially lower yellow values than the comparative samples.

vention are processed (see Example 20) no fur-like deposit on the wall of the equipment can be observed, while in comparative Example K the equipment exhibits a furry deposit after 70 kg. have been processed. In this furring, bisphenol as well as nitrogen can be detected.

Furthermore, the loss of weight of all three samples after 120 minutes at 230° C. in air and the yellow coloration after 14 days of storage in water at 100° C. are determined. Although the same phenol radical is present in all three phenol-alkanoic acid esters, there is a substantial difference with respect to the effect. The mixture used

TABLE 2

| Example | Stabilizer | Amount, percent by weight | Loss of weight, percent after— | | Yellow value after 30 min. |
|---|---|---|---|---|---|
| | | | 45 min. | 120 min. | |
| E | Bis-[3-(2-methylcyclohexyl)-5-methyl-2-hydroxyphenyl]-methane | 0.5 | 1.1 | 35.0 | 20.2 |
| F | do | 1.0 | 0.8 | 6.2 | 33.2 |
| 11 | Tetrakis[β-(3,5,-di-tert.butyl-4-hydroxyphenyl)-propionyloxymethyl]-methane | 0.5 | 0.64 | 7.8 | 14.3 |
| 12 | do | 1.0 | 0.54 | 4.2 | 12.3 |
| 13 | 1,2-bis[γ-(3-tert.butyl-4-hydroxyphenyl)-pentanoyloxypropane | 1.0 | 0.75 | 5.7 | 15.0 |
| 14 | 1,4-bis(3-methyl-5-tert.-butyl-4-hydroxy benzoyloxy)-butane | 1.0 | 0.68 | 5.2 | 16.2 | in accordance with the invention shows the least discoloration at storage in water and the least loss of weight.

TABLE 4

| Example | Stabilizer combination | Amount, percent by weight | Loss of weight, percent | Yellow value | |
|---|---|---|---|---|---|
| | | | | Before | After 14 days |
| K | {1-(3,5-di-tert.-butyl-4-hydroxy-benzoyloxy)-n-octadecane / Dicyanodiamide} | 0.5 / 0.3 | 3.2 | 1.3 | 37.6 |
| L | {1-[β-(3,5-di-tert.-butyl-4-hydroxy-phenyl)-propionyloxy]-n-octadecane / Calcium hydroxide} | 0.5 / 0.1 | 4.5 | 1.8 | 47.0 |
| 20 | {1,6-bis[β-(3,5-di-tert.-butyl-4-hydroxy-phenyl)-propionyloxy]-hexane / Calcium hydroxide} | 0.5 / 0.1 | 2.8 | 1.2 | 15.8 |

EXAMPLES 15 TO 19

A copolymer made from 96% of trioxan and 4% of 1,3-dioxolane (RSV value: 0.89 dl./g.) is thoroughly mixed with the stabilizer combinations indicated in Table 3, and granulated in a commercial extruder. After the granulation, the loss of weight of the samples is determined after heating in air at 230° C. for 120 minutes. Table 3 shows the stabilizer combinations used in accordance with the invention are by far superior to known stabilizers (see comparative Examples G and I).

EXAMPLE 21

A copolymer made from 98% of trioxan and 2% of ethylene oxide (RSV value: 0.85 dl./g.) is mixed thoroughly with the stabilizer combinations indicated in Table 5, and granulated in a commercial extruder. From the granules, rods for the tensile strength test and plates having a dimension of 70 x 70 x 4 mm. are manufactured in an injection-extrusion molding machine. From the plates, the standard rods required for the impact strength and impact strength notched tests are manufactured and

TABLE 3

| Example | Stabilizer combination | Amount, percent by weight | Loss of weight, percent |
|---|---|---|---|
| G | {Bis[3-(2-methyl-cyclohexyl)-5-methyl-2-hydroxy-phenyl]-methane / Calcium stearate} | 0.5 / 0.1 | 35 |
| H | {Bis[3-(2-methyl-cyclohexyl)-5-methyl-2-hydroxy-phenyl]-methane / Calcium ricinoleate} | 0.7 / 0.1 | 8.6 |
| I | {4,4-bis(2-hydroxy-3-tert.butyl-6-methyl-phenyl)-butane / Magnesium hydroxide} | 0.7 / 0.1 | 7.3 |
| 15 | {1,6-bis[β-(3,5-di-tert.butyl-4-hydroxy-phenyl)-propionyloxy]-hexane / Magnesium hydroxide} | 0.5 / 0.1 | 2.4 |
| 16 | {1,1,1-tris[β-(3,5-di-tert-butyl-4-hydroxy-phenyl)-propionyloxymethyl]-ethane / Barium hydroxide} | 0.5 / 0.1 | 3.7 |
| 17 | {Tetrakis[β-(3,5-di-tert.butyl-4-hydroxy-phenyl)-propionyloxymethyl]-methane / Strontium hydroxide} | 0.5 / 0.1 | 3.2 |
| 18 | {Tetrakis[β-(3,5-di-tert.butyl-4-hydroxy-phenyl)-propionyloxymethyl]-methane / Calcium stearate} | 0.7 / 0.2 | 4.0 |
| 19 | {Tetrakis[β-(3,5-di-tert.butyl-4-hydroxy-phenyl)-propionyloxymethyl]-methane / Calcium hydroxide} | 0.7 / 0.03 | 3.8 |

EXAMPLE 20

200 kg. each of a copolymer made from 98 parts of trioxan and 2 parts of ethylene oxide (RSV value: 0.83 dl./g.) are stabilized by means of the stabilizer combinations indicated in Table 4. After granulation and drying, the samples, one after the other, are processed into molded articles in an injection-extrusion molding machine. The temperature of the melt during this operation is 200° C., the temperature of the equipment 80° C. After the whole 200 kg. of the molding composition according to the inthese rods are stored together with the rods for the tensile strength test for 1 year in a drying oven at 100° C. The values measured before and after the heat load are listed in Table 5, and they show the superiorty of the stabilizers used in accordance with the present invention over a known phenol (see comparative Example M).

The tensile strength is measured according to DIN 45,455, the impact strength and the impact strength notched according to DIN 53,453.

TABLE 5

| Example | Stabilizer combination | Amount, percent by weight | Tensile strength (kp./cm.²) | | Impact strength (kp.cm./cm.²) | | Impact strength notched (kp.cm./cm.²) | |
|---|---|---|---|---|---|---|---|---|
| | | | Before | After 1 year | Before | After 1 year | Before | After 1 year |
| M | Bis(5-methyl-3-tert-.butyl-2-hydroxy-phenyl)-methane. | 0.5 | 620 | 413 | Without break... 16 | | 6.4 | 1.0 |
| | Calcium ricinoleate | 0.1 | | | | | | |
| 21 | Tetrakis[β-(3,5-di-tert.-butyl-4-hydroxy-phenyl)-propionyloxymethyl]-methane. | 0.5 | 630 | 628 | ......do............ | Without break... | 6.6 | 5.5 |
| | Calcium ricinoleate | 0.1 | | | | | | |

EXAMPLE 22 TO 24

A copolymer made from 98% of trioxane and 2% of ethylene oxide (RSV value: 0.82 dl./g.) is thoroughly mixed with the stabilizers listed in Table 6, and granulated in a commercial extruder. The loss of weight of the samples of dried granules is determined after heating in air at 230° C. for 45 and 120 minutes, respectively.

The synergistic effect of the stabilizer combinations used in accordance with the invention, compared with the effect of various hydroxyphenyl-alkanoic acid compounds without addition of an alkaline earth metal compound (see comparative Examples N to P) is shown in Table 6.

TABLE 6

| Example | Stabilizer or stabilizer combination | Amount, percent by weight | Loss of weight, (percent) after— | |
|---|---|---|---|---|
| | | | 45 min. | 120 min. |
| N | 1,1,1-tris[β-(3,5-di-tert.-butyl-4-hydroxy-phenyl)-propionyloxymethyl]-ethane | 1.0 | 21 | 58 |
| O | 1,6-bis[β-(3,5-di-tert.-butyl-4-hydroxy-phenyl)-propionyloxy]-hexane | 1.0 | 17 | 53 |
| P | Tetrakis[β-(3,5-di-tert.-butyl-4-hydroxy-phenyl)-propionyloxymethyl]-methane | 1.0 | 19 | 41 |
| 22 | 1,1,1-tris[β-(3,5-di-tert.-butyl-4-hydroxy-phenyl)-propionyloxymethyl]-ethane | 1.0 | 0.76 | 2.4 |
| | Calcium ricinoleate | 0.1 | | |
| 23 | 1,6-bis[β-(3,5-di-tert.-butyl-4-hydroxy-phenyl)-propionyloxy]-hexane | 1.0 | 0.55 | 1.8 |
| | Calcium ricinoleate | 0.1 | | |
| 24 | Tetrakis[β-(3,5-di-tert.-butyl-4-hydroxy-phenyl)-propionyloxymethyl]-methane | 1.0 | 0.59 | 3.0 |
| | Calcium ricinoleate | 0.1 | | |

What is claimed is:

1. Stabilized polyoxymethylene molding compositions having incorporated therein a stabilizer composition consisting essentially of
(a) from 0.05 to 4 percent by weight, calculated on the polyoxymethylene, of components of the formula

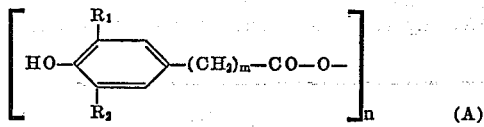

$$\left[ HO-\!\!\!\begin{array}{c}R_1\\ \phantom{}\\ R_2\end{array}\!\!\!-(CH_2)_m-CO-O- \right]_n \quad (A)$$

in which $R_1$ is an alkyl radical having from 1 to 6 carbon atoms, $R_2$ is a hydrogen atom or an alkyl radical having from 1 to 6 carbon atoms, A is a bi- to hexavalent aliphatic hydrocarbon radical having from 1 to 12 carbon atoms, $m$ is zero or an integer of from 1 to 6 and $n$ corresponds to the valence of A, and
(b) from 0.01 to 3 percent by weight, calculated on the polyoxymethylene, of alkaline earth metal salts of carboxylic acids having from 10 to 20 carbon atoms and/or alkaline earth metal hydroxides.

2. Molding compositions as claimed in claim 1, containing as polyoxymethylenes copolymers made from trioxan and cyclic ethers and/or cyclic acetals and/or linear polyacetals.

3. Molding compositions as claimed in claim 1 containing as polyoxymethylenes copolymers made from trioxan and a three-membered cyclic ether.

4. Molding compositions as claimed in claim 1 containing as component (a) esters of hexanediol-(1,6), trimethylolethane or pentaerythritol with β-(3,5-di-tert.-butyl-4-hydroxyphenyl)-propionic acid.

5. Molding compositions as claimed in claim 1, containing as component (b) calcium salts of saturated or unsaturated aliphatic carboxylic acids having from 12 to 18 carbon atoms.

6. Molding compositions as claimed in claim 1 containing as component (b) calcium ricinoleate.

References Cited

UNITED STATES PATENTS

| 3,206,431 | 9/1965 | Doyle et al. | 260—45.85 |
| 3,484,400 | 12/1969 | Halek | 260—18 |
| 3,484,399 | 12/1969 | Kakos | 260—18 |
| 3,635,882 | 1/1972 | Starr et al. | 260—45.7 |
| 3,644,482 | 2/1972 | Dexter et al. | 260—45.85 |
| 3,340,219 | 9/1967 | Stemmler | 260—18 |

FOREIGN PATENTS

| 1,489,414 | 7/1967 | France | 260—45.85 |

DONALD E. CZAJA, Primary Examiner

E. C. RZUCIDLO, Assistant Examiner

U.S. Cl. X.R.

260—45.7 R, 45.85 S, 45.95